(12) United States Patent
Ito

(10) Patent No.: US 9,546,605 B2
(45) Date of Patent: Jan. 17, 2017

(54) THROTTLE CONTROL DEVICE FOR CONTROLLING ENGINE TORQUE

(75) Inventor: Yukikazu Ito, Miyoshi (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 197 days.

(21) Appl. No.: 14/362,745

(22) PCT Filed: Dec. 8, 2011

(86) PCT No.: PCT/JP2011/078465
§ 371 (c)(1),
(2), (4) Date: Jun. 4, 2014

(87) PCT Pub. No.: WO2013/084342
PCT Pub. Date: Jun. 13, 2013

(65) Prior Publication Data
US 2014/0343824 A1    Nov. 20, 2014

(51) Int. Cl.
*F02D 9/02* (2006.01)
*F02D 41/04* (2006.01)
(Continued)

(52) U.S. Cl.
CPC ............. *F02D 9/02* (2013.01); *F02D 11/10* (2013.01); *F02D 41/0002* (2013.01);
(Continued)

(58) Field of Classification Search
CPC .............. B60W 10/06; B60W 2510/0657; F02D 11/05; F02D 2200/1006; F02D 41/123; F02D 41/2451; F02D 11/10; F02D 2250/18; F02D 2250/21; F02D 41/0002; F02D 41/04; F02D 41/10; F02D 41/1497; F02D 9/02; Y10T 477/814; Y10T 10/42
(Continued)

(56) References Cited

U.S. PATENT DOCUMENTS 5,010,866 A * 4/1991 Ohata ................. F02D 41/1401
123/352
6,006,724 A * 12/1999 Takahashi ............. F02D 11/105
123/339.19
(Continued)

FOREIGN PATENT DOCUMENTS

JP    2002-303177 A    10/2002
JP    2006-291803 A    10/2006
(Continued)

*Primary Examiner* — Erick Solis
*Assistant Examiner* — Carl Staubach
(74) *Attorney, Agent, or Firm* — Andrews Kurth Kenyon LLP

(57) ABSTRACT

The present invention addresses a solution of improving precision with which requested torque at a time of a transient operation is realized in a control device for an internal combustion engine that controls torque that is generated by an internal combustion engine by control of an air amount by means of a throttle. To this end, the present control device calculates a target intake pipe pressure for realizing a target air amount, and calculates predicted pump loss from the target intake pipe pressure. By adding the predicted pump loss to requested torque to the internal combustion engine, 360° indicated requested torque that should be realized in a compression/expansion strokes is calculated. An air amount for realizing the 360° indicated requested torque is calculated as the target air amount, and an opening of the throttle is determined based on the target air amount.

2 Claims, 1 Drawing Sheet

US 9,546,605 B2

Page 2

(51) Int. Cl.
 *F02D 41/10* (2006.01)
 *F02D 41/14* (2006.01)
 *F02D 11/10* (2006.01)
 *F02D 41/00* (2006.01)

(52) U.S. Cl.
 CPC .............. *F02D 41/04* (2013.01); *F02D 41/10* (2013.01); *F02D 41/1497* (2013.01); *F02D 2200/1006* (2013.01); *F02D 2250/18* (2013.01); *F02D 2250/21* (2013.01); *Y02T 10/42* (2013.01)

(58) Field of Classification Search
 USPC ........ 701/103, 105, 110; 123/325, 326, 333, 123/376, 402–403, 406.12, 406.19, 123/406.23–406.25, 406.33, 123/406.45–406.52, 492, 493, 674–679, 123/681–684
 See application file for complete search history.

(56) References Cited

U.S. PATENT DOCUMENTS

| | | | | |
|---|---|---|---|---|
| 6,390,063 | B1 * | 5/2002 | Obata | F01L 9/04 123/399 |
| 6,951,198 | B1 * | 10/2005 | Megli | F02D 13/04 123/321 |
| 7,236,874 | B2 * | 6/2007 | Ichihara | F02D 41/123 123/198 DB |
| 7,991,537 | B2 * | 8/2011 | Halleberg | F02D 41/1497 123/486 |
| 8,205,595 | B2 * | 6/2012 | Mizuno | F02D 29/02 123/350 |
| 8,965,660 | B2 * | 2/2015 | Miyata | F02D 11/105 701/102 |
| 2006/0102143 | A1 * | 5/2006 | Yagi | F02D 11/105 123/339.11 |
| 2006/0229158 | A1 * | 10/2006 | Ichihara | F02D 41/123 477/185 |
| 2007/0192015 | A1 | 8/2007 | Konishi | |
| 2008/0051976 | A1 * | 2/2008 | Kimoto | F02B 33/44 701/103 |
| 2010/0006064 | A1 * | 1/2010 | Mizuno | F02D 29/02 123/350 |
| 2010/0198485 | A1 * | 8/2010 | Ohtsuka | F02D 11/105 701/103 |
| 2012/0035834 | A1 | 2/2012 | Takahashi | |

FOREIGN PATENT DOCUMENTS

| | | |
|---|---|---|
| JP | 2007-127035 A | 5/2007 |
| JP | 2011-094595 A | 5/2011 |
| JP | 2011-149405 A | 8/2011 |
| WO | 2011-135681 A1 | 11/2011 |

* cited by examiner

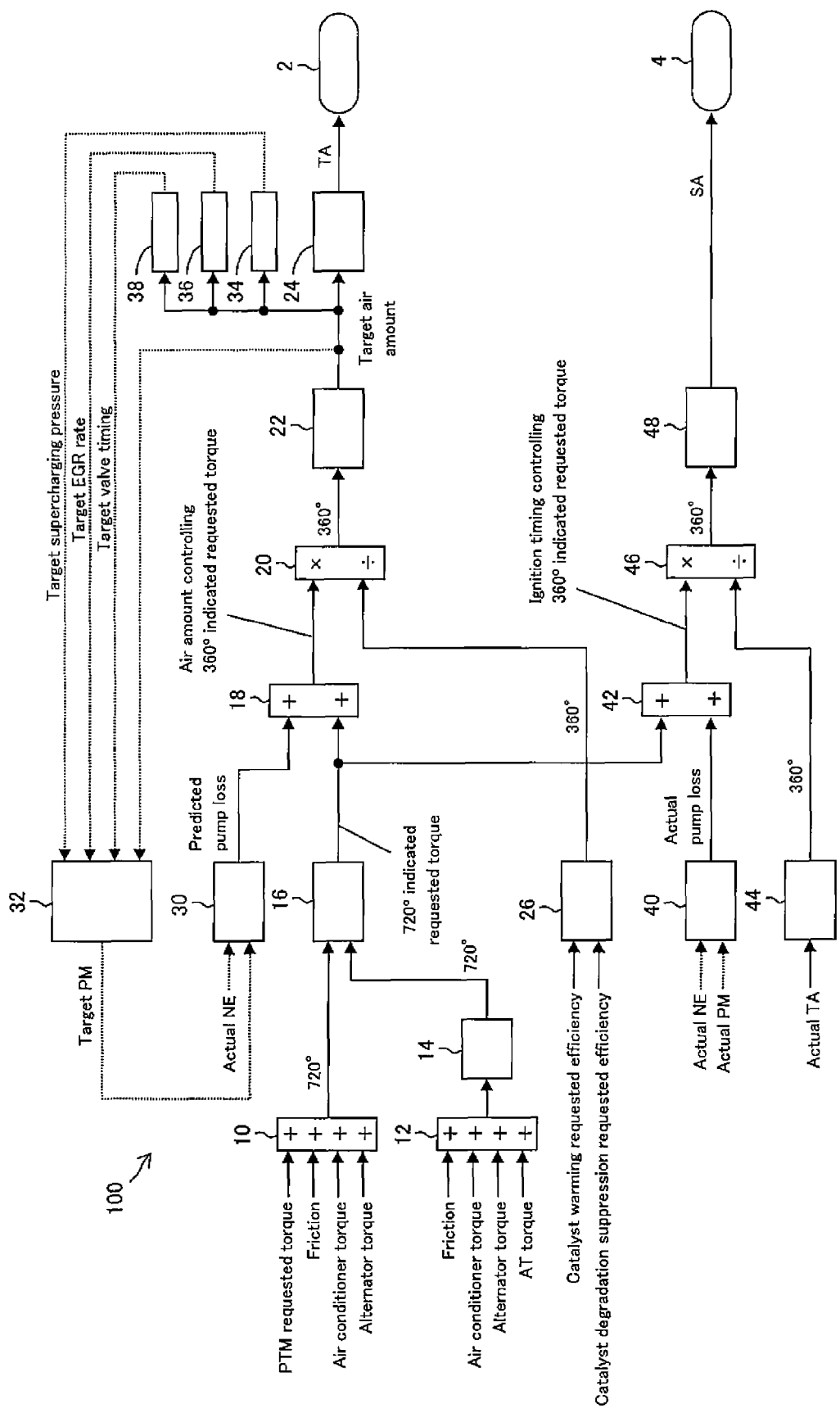

THROTTLE CONTROL DEVICE FOR CONTROLLING ENGINE TORQUE

CROSS-REFERENCE TO RELATED APPLICATIONS

This is a national phase application based on the PCT International Patent Application No. PCT/JP2011/078465 filed on Dec. 8, 2011, the entire contents of which are incorporated herein by reference.

TECHNICAL FIELD

The present invention relates to a control device for an internal combustion engine that controls torque that is generated by the internal combustion engine by control of an air amount by means of a throttle.

BACKGROUND ART

In the torque demand control of an internal combustion engine for an automobile, more particularly, a gasoline engine, which has been conventionally proposed, requested torque to the internal combustion engine is determined from the acceleration operation amount by a driver. Subsequently, the air amount for realizing the requested torque is determined as a target air amount, and the throttle opening is determined in accordance with the target air amount.

Incidentally, the air amount that is controlled by a throttle affects the magnitude of the torque that is generated by fuel being combusted from a compression stroke to an expansion stroke. However, to be precise, the torque that is generated by an internal combustion engine is not determined only by the torque generated by combustion of the fuel. The value that is obtained by subtracting pump loss from the torque generated by combustion of the fuel is the torque that is generated by the internal combustion engine, namely, indicated torque of the internal combustion engine. Accordingly, in order to calculate the target air amount necessary for realization of the requested torque accurately, the pump loss that is generated from an exhaust stroke to an intake stroke is desirably taken into consideration.

The art of using pump loss in calculation of the target air amount in torque demand control is disclosed in, for example, Japanese Patent Laid-Open No. 2006-291803. According to the art that is disclosed in the literature, the pump loss is calculated based on a pressure difference between atmospheric pressure and an intake pipe, and the engine speed. Indicated requested torque is calculated by adding the pump loss to the requested torque, and the target air amount is calculated from the indicated requested torque.

However, the art disclosed in the above described literature has a problem. The art disclosed in the above described literature calculates the actual value of the pump loss from the actually measured value of the intake pipe pressure by the intake pipe pressure sensor, and uses the actual value of the pump loss in calculation of the target air amount. Since the intake pipe pressure changes in response to movement of the throttle, a change also occurs to the pump loss by the change of the intake pipe pressure at a time of a transient operation when the throttle is moving. Namely, by the throttle operations, the value of the pump loss that is used in calculation of the target air amount changes. Therefore, in the art disclosed in the above described literature, hunting occurs to the operation of the throttle at the time of a transient operation, and there arises the fear that control cannot be quickly performed to achieve the air amount that can realize the requested torque.

CITATION LIST

Patent Literatures

Patent Literature 1: Japanese Patent Laid-Open No. 2006-291803
Patent Literature 2: Japanese Patent Laid-Open No. 2011-094595
Patent Literature 3: Japanese Patent Laid-Open No. 2007-127035
Patent Literature 4: Japanese Patent Laid-Open No. 2011-149405

SUMMARY OF INVENTION

The present invention is made in the light of the aforementioned problem, and has an object to improve precision with which requested torque at a time of a transient operation is realized, in a control device for an internal combustion engine that controls torque that is generated by the internal combustion engine by control of an air amount by means of a throttle. In order to achieve the object like this, the present invention provides the control device for an internal combustion engine that is configured to operate as follows.

A control device that is provided by the present invention calculates a target intake pipe pressure for realizing a target air amount by using a result of modeling a relation that is established between an air amount and an intake pipe pressure, for example. Predicted pump loss, that is, an intake pipe pressure that is predicted when the target intake pipe pressure is achieved is calculated from the target intake pipe pressure. The present control device calculates 360° indicated requested torque by adding the predicted pump loss to requested torque to the internal combustion engine. The 360° indicated requested torque means torque that should be realized in a compression and an expansion strokes by combustion of fuel. The present control device calculates the air amount for realizing the 360° indicated requested torque as the target air amount, and determines an opening of a throttle based on the target air amount.

As described above, the present control device uses the predicted pump loss that is calculated from the target intake pipe pressure for realizing the target air amount, instead of an actual intake pipe pressure, in calculation of the target air amount. In this case, if the target air amount changes, the value of the predicted pump loss that is used in calculation of the target air amount also changes according to change of the target intake pipe pressure. However, processing of all of them is performed by calculation in the control device and is not influenced by an operation of the throttle. Furthermore, speed of the calculation is sufficiently faster than response speed of air to the operation of the throttle. Therefore, according to the present control device, even at a time of a transient operation, hunting does not occur to the operation of the throttle, and the air amount can be quickly controlled to the air amount that can realize the requested torque.

The internal combustion engine that is an object to be controlled may have one or a plurality of actuators that change the air amount in cooperation with the throttle. Such actuators include a variable valve timing mechanism, an EGR device, a turbocharger with a waste gate valve and the like. In this case, the control device provided by the present invention can include a function of calculating target actuator values of the actuators based on the target air amount, and correcting the target intake pipe pressure in accordance of the target actuator values. As a method for correcting the target intake pipe pressure, a method for calculating the target intake pipe pressure from the target air amount and the target actuator value by using the result of modeling a relation that is established among the intake pipe pressure, the air amount and the actuator values, for example, can be adopted.

Furthermore, in the control device provided by the present invention, control of ignition timing can be performed in cooperation with control of the air amount by means of the throttle and the like. In the ignition timing control, the present control device calculates actual pump loss from the actual intake pipe pressure that can be measured by an intake pipe pressure sensor, for example. Subsequently, by adding the actual pump loss to the requested torque, second 360° indicated requested torque is calculated, and the estimated torque that is realized under the optimal ignition timing is calculated based on the actual opening of the throttle. The present control device sets a ratio of the second 360° indicated requested torque to the estimated torque as a target efficiency, and controls the ignition timing in accordance with the target efficiency.

As described above, the present control device uses the actual pump loss that is calculated from the actual intake pipe pressure instead of the target intake pipe pressure in calculation, in the ignition timing control. The ignition timing does not have an influence on the intake pipe pressure, and therefore, even if the actual pump loss is used, hunting does not occur as in the case of the air amount control. Meanwhile, responsiveness of torque is far more superior than torque control by the air amount, and therefore, using the actual pump loss is meaningful. That is, by using the actual pump loss in ignition timing control, the ignition timing can be precisely controlled so that the torque generated by the internal combustion engine becomes requested torque under the pump loss at the present point of time.

BRIEF DESCRIPTION OF DRAWINGS

FIG. 1 is a block diagram showing a configuration of a control device of an embodiment of the present invention.

DESCRIPTION OF EMBODIMENT

Hereinafter, an embodiment of the present invention will be described with reference to the drawings.

An internal combustion engine (hereinafter, an engine) that is an object to be controlled in the embodiment of the present invention is a spark ignition-type four-cycle reciprocating engine. A control device controls an operation of the engine by operating actuators included in the engine. The actuators that can be operated by the control device of the present embodiment include a throttle, an ignition device, a variable valve timing mechanism, an EGR device and a waste gate valve of a turbocharger. The present control device operates these actuators to control the operation of the engine.

A block diagram of FIG. 1 shows a configuration of the control device of the present embodiment. Respective elements that configure a control device 100 in FIG. 1 are the result of especially expressing only elements relating to air amount control and ignition timing control for torque control in the diagram, among various functional elements which the control device 100 has. Accordingly, FIG. 1 does not mean that the control device 100 is configured by only these elements. Note that the control device 100 is a computer for an automobile, and the respective elements are virtually realized when exclusive software stored in a memory is executed by a CPU.

Hereinafter, a configuration of the control device 100 will be described with focus on functions of the respective elements shown in FIG. 1.

The control device 100 includes arithmetic units 10, 12 and 14 and a mediation unit 16, as elements relating to calculation of requested torque. The arithmetic unit 10 adds torque corresponding to friction, torque for driving an air conditioner, and torque for driving an alternator to PTM requested torque, and outputs a total value of them. The PTM requested torque refers to requested torque that is issued from a power train manager that generally controls a whole of a drive system of a vehicle. The PTM requested torque is determined based on an operation amount of an accelerator pedal by a driver, and signals from control devices for a vehicle such as a VSC and an ECT. Note that a value of torque that is calculated in the arithmetic unit 10 is a requested value of indicated torque per one cycle, namely, a crank angle of 720°.

The arithmetic unit 12 adds up the torque corresponding to friction, the torque for driving an air conditioner, the torque for driving an alternator and torque that is consumed by an automatic transmission, and outputs a total value of them. A calculated value by the arithmetic unit 12 shows a value of the torque necessary to keep an idling speed. In the arithmetic unit 14, various corrections corresponding to environmental conditions and the like are applied to the calculated value that is outputted from the arithmetic unit 12. The value of the torque that is calculated in the arithmetic units 12 and 14 is a requested value of indicated torque per crank angle of 720°, similarly to the calculated value by the arithmetic unit 10.

Calculation by the arithmetic unit 10 and calculation by the arithmetic units 12 and 14 are both always performed. The control device 100 inputs the two calculated values by them into the mediation unit 16. The mediation unit 16 determines whether the engine is in an idling state, and selects any one of the two calculated values in accordance with the determination result. In the control device 100, the calculated value selected in the mediation unit 16 is used as the requested torque to the engine. Since the requested torque that is outputted from the mediation unit 16 is a requested value of the indicated torque per a crank angle of 720°, this requested torque will be called 720° indicated requested torque hereinafter.

The control device 100 inputs the 720° indicated requested torque that is outputted from the mediation unit 16 into an arithmetic unit 18. In the arithmetic unit 18, predicted pump loss is added to the 720° indicated requested toque. The predicted pump loss is a predicted value of pump loss that occurs from an intake stroke to an exhaust stroke. The predicted pump loss is added to the 720° indicated requested torque that is the requested torque for one cycle, whereby the requested value of the indicated torque that is generated by combustion of fuel from a compression stroke to an expansion stroke is calculated. Hereinafter, this will be called 360° indicated requested torque. Furthermore, the 360° indicated requested torque that is calculated in the arithmetic unit 18 is used for controlling an air amount, and therefore, is also called air amount controlling 360° indicated requested torque, in order to be distinguished from indicated requested torque for controlling ignition timing, which will be described later.

The control device 100 calculates the predicted pump loss in an arithmetic unit 30. The arithmetic unit 30 calculates the predicted pump loss, namely, a pump loss that is predicted when the target intake pipe pressure is achieved, from an actual speed (actual NE) of the engine calculated from a signal of a crank angle sensor and the target intake pipe pressure (target PM). In calculation of the predicted pump loss, a map in which the intake pipe pressure and the pump loss are associated with each other, with one or a plurality of parameters including the engine speed as a key is used.

The control device 100 calculates the target intake pipe pressure in an arithmetic unit 32. The target intake pipe pressure is an intake pipe pressure necessary for realization of the target air amount, and a value thereof changes in accordance with valve timing, an EGR rate and a supercharging pressure. The arithmetic unit 32 calculates the target intake pipe pressure from the target air amount, the target valve timing, a target EGR rate and a target supercharging pressure. In calculation of the target intake pipe pressure, an inverse intake valve model is used. In the inverse intake valve model, a relation of the air amount and the intake pipe pressure is expressed by a linear function, and respective coefficients included in the linear function are determined from a map with the valve timing, the EGR rate and the supercharging pressure as axes.

The 360° indicated requested torque that is calculated in the arithmetic unit 18 is inputted into an arithmetic unit 20. In the arithmetic unit 20, the 360° indicated requested torque is raised by being divided by a requested efficiency. The requested efficiency is a parameter for controlling ignition timing, and is set at a value of 1 or a smaller value. By setting the requested efficiency to one, the ignition timing is controlled to be optimal ignition timing, whereas by setting the requested efficiency at a value smaller than 1, the ignition timing is delayed from the optimal ignition timing.

The requested efficiency that is used in calculation in the arithmetic unit 20 is sent from a mediation unit 26. In the mediation unit 26, a requested efficiency for warming a catalyst and a requested efficiency for suppression of degradation of the catalyst are inputted. Values of the respective requested efficiencies are set at different values. If only any one of them is inputted, the mediation unit 26 outputs the value of the inputted requested efficiency to the arithmetic unit 20. If both of them is inputted, the mediation unit 26 selects any one of them in accordance with a rule set in advance, and outputs the value of the selected requested efficiency to the arithmetic unit 20. If none of them is inputted therein, the mediation unit 26 outputs one that is the maximum value to the arithmetic unit 20 as the value of the requested efficiency.

The 360° indicated requested torque that is processed in the arithmetic unit 20 is inputted into an arithmetic unit 22. The arithmetic unit 22 converts the 360° indicated requested torque into a target air amount by using an air amount map. The air amount mentioned here means the amount of air that is taken into a cylinder (a charging efficiency or a load factor that is obtained by making the air amount dimensionless can be used instead). The air amount map is a map in which the torque and the air amount are associated with various engine state quantities including the engine speed and the air-fuel ratio as a key, on the precondition that the ignition timing is the optimum ignition timing (ignition timing that is at more delayed side, of MBT and trace knock ignition timing).

The target air amount calculated in the arithmetic unit 22 is inputted into an arithmetic unit 24. The arithmetic unit 24 converts the target air amount into a throttle opening by using an inverse model of an air model. The air model is a physical model that is obtained by modeling response characteristic of the air amount to an operation of a throttle 2, and therefore, by using the inverse model thereof, the throttle opening that is necessary for achievement of the target air amount can be inversely calculated. The control device 100 performs an operation of the throttle 2 in accordance with a throttle opening (TA) that is calculated in the arithmetic unit 24.

Furthermore, in parallel with the target air amount being inputted into the arithmetic unit 24, the target air amount is also inputted into arithmetic units 34, 36 and 38. The arithmetic unit 34 calculates a target supercharging pressure from the target air amount by using a map that is adapted by a test. The target supercharging pressure is a target actuator value of the waste gate valve. The arithmetic unit 36 calculates a target EGR rate from the target air amount by using a map adapted by a test. The target EGR rate is a target actuator value of the EGR device. The arithmetic unit 36 calculates target valve timing from the target air amount by using a map that is adapted by a test. The target valve timing is a target actuator value of the variable valve timing mechanism. The control device 100 performs operations of the respective actuators in accordance with the target actuator values that are calculated in these arithmetic units 34, 36 and 38, and inputs the target actuator values into the aforementioned arithmetic unit 32.

The control device 100 executes processing for ignition timing control, which will be described as follows, in parallel with the processing for the air amount control described above.

In the processing for ignition timing control, actual pump loss is calculated in an arithmetic unit 40. The arithmetic unit 40 calculates actual pump loss, namely, the pump loss that is generated at the present point of time from the actual speed of the engine (actual NE) that is calculated from the signal of the crank angle sensor and an actual intake pipe pressure (actual PM) that is calculated from the signal of the intake pipe pressure sensor. In calculation of the actual pump loss, the same map as the map used in calculation of the predicted pump loss is used.

The control device 100 inputs the actual pump loss that is calculated in the arithmetic unit 40 into an arithmetic unit 42. In the arithmetic unit 42, the actual pump loss is added to the 720° indicated requested torque. The 720° indicated requested torque that is inputted into the arithmetic unit 42 has the same value as the torque that is inputted into the arithmetic unit 18. The actual pump loss is added to the 720° indicated requested torque, whereby the requested value of the indicated torque that is generated from the compression stroke to the expansion stroke by combustion of fuel is calculated. Hereinafter, second 360° indicated requested torque that is calculated in the arithmetic unit 42 will be called ignition timing controlling 360° indicated requested torque. The ignition timing controlling 360° indicated requested torque corresponds to the aforementioned air amount controlling 360° indicated requested torque at the time of a steady state operation. However, at the time of a transient operation, a difference occurs between the two kinds of 360° indicated requested torque by the amount of a response delay of the actual intake pipe pressure to the target intake pipe pressure.

The control device 100 inputs the ignition timing controlling 360° indicated requested torque that is calculated in the arithmetic unit 42 into an arithmetic unit 46. In the arithmetic unit 46, a ratio of the ignition timing controlling 360° indicated requested torque and estimated torque is calculated. The estimated torque is the torque that is realized when the ignition timing is controlled to optimal ignition timing under the present throttle opening. The torque ratio that is calculated in the arithmetic unit 46 is used as a target efficiency for determining ignition timing.

The estimated torque that is used in calculation in the arithmetic unit 46 is sent from an arithmetic unit 44. The arithmetic unit 44 converts an actual throttle opening that is measured by the throttle opening sensor into the estimated air amount by using a forward model of the air model described above. Next, the estimated air amount is converted into the estimated torque by using a torque map. The torque map is an inverse map of the air amount map described above, and is the map in which the air amount and the torque are associated with each other with various engine state quantities as keys on the precondition that the ignition timing is the optimal ignition timing.

The target efficiency that is calculated in the arithmetic unit 46 is inputted into an arithmetic unit 48. The arithmetic unit 48 calculates ignition timing from the inputted target efficiency. In more detail, the arithmetic unit 48 calculates optimal ignition timing based on the engine state quantities such as the engine speed, the air amount and the air-fuel ratio, and calculates a delay amount for the optimal ignition timing from the inputted target efficiency. When the target efficiency is one, the delay amount is set to zero, and as the target efficiency is smaller than one, the delay amount is made larger. The result of adding up the delay amount to the optimal ignition timing is calculated as final ignition timing. In calculation of the optimal ignition timing, a map in which the optimal ignition timing are associated with various engine state quantities, for example, can be used. In calculation of the delay amount, a map in which the delay amount are associated with the efficiency and various engine state quantities, for example, can be used. The control device 100 performs an operation of the ignition device 4 in accordance with the ignition timing (SA) that is calculated in the arithmetic unit 48.

The above is the explanation of the configuration of the control device 100 of the present embodiment. According to the present embodiment, the control device 100 uses the predicted pump loss that is calculated from the target intake pipe pressure instead of the actual intake pipe pressure in calculation of the target air amount. The target intake pipe pressure is calculated from the target air amount, and therefore, if the target air amount changes, the value of the predicted pump loss that is used in calculation of the target air amount also changes according to change of the target intake pipe pressure. However, the processing of all of them is performed by calculation in the control device 100, and is not influenced by the operation of the throttle 2. Furthermore, the calculation is performed in one control period (for example, 8 msec), and therefore, the calculation is sufficiently faster than the response speed of air to the operation of the throttle 2. Therefore, according to the control device 100, even at the time of a transient operation, hunting does not occur to the operation of the throttle 2, and the air amount can be quickly controlled to the air amount that can realize the requested torque (720° indicated requested torque).

Furthermore, according to the present embodiment, the control device 100 uses the actual pump loss that is calculated from the actual intake pipe pressure instead of the target intake pipe pressure in calculation, in ignition timing control. The ignition timing does not have an influence on the intake pipe pressure, and therefore, even if the actual pump loss is used, hunting as in the case of air amount control does not occur. Meanwhile, torque control by ignition timing is far more superior in responsiveness of torque than torque control by the air amount, and therefore, by using the actual pump loss in ignition timing control, the ignition timing can be precisely controlled so that the torque generated by the engine becomes requested torque (720° indicated requested torque) under pump loss at the present point of time.

Note that the present invention is not limited to the aforementioned embodiment, and may be carried out by being variously modified within the range without departing from the scope of the present invention.

REFERENCE SIGNS LIST

2 Throttle
4 Ignition device
18 Arithmetic unit for calculating air amount controlling 360° indicated requested torque
22 Arithmetic unit for calculating target air amount
24 Arithmetic unit for calculating throttle opening
30 Arithmetic unit for calculating predicted pump loss
32 Arithmetic unit for calculating target intake pipe pressure
40 Arithmetic unit for calculating actual pump loss
42 Arithmetic unit for calculating ignition timing controlling 360° indicated requested torque
48 Arithmetic unit for calculating ignition timing
100 Control device

The invention claimed is:

1. A control device for an internal combustion engine that controls torque that is generated by the internal combustion engine by control of an air amount by means of a throttle, comprising:
   an arithmetic unit that calculates a target intake pipe pressure for realizing a target air amount;
   an arithmetic unit that calculates predicted pump loss from the target intake pipe pressure;
   an arithmetic unit that calculates 360° indicated requested torque that is torque that should be realized in compression and expansion strokes, by adding the predicted pump loss to requested torque to the internal combustion engine;
   an arithmetic unit that calculates an air amount for realizing the 360° indicated requested torque as the target air amount;
   an arithmetic unit that determines an opening of the throttle based on the target air amount;
   an arithmetic unit that calculates actual pump loss from actual intake pipe pressure;
   an arithmetic unit that calculates second 360° indicated requested torque by adding the actual pump loss to the requested torque;
   an arithmetic unit that calculates estimated torque that is realized under optimal ignition timing based on an actual opening of the throttle; and
   an arithmetic unit that determines ignition timing with a ratio of the second 360° indicated requested torque to the estimated torque as a target efficiency, wherein
   the control device controls ignition timing according to the determined ignition timing, and
   the control device controls the throttle according to the determined openings.

2. A control device for an internal combustion engine that controls torque that is generated by the internal combustion engine by control of an air amount by means of a throttle, comprising:
   an arithmetic unit that calculates a target intake pipe pressure for realizing a target air amount;
   an arithmetic unit that calculates predicted pump loss from the target intake pipe pressure;
   an arithmetic unit that calculates 360° indicated requested torque that is torque that should be realized in compression and expansion strokes, by adding the predicted pump loss to requested torque to the internal combustion engine;
   an arithmetic unit that calculates an air amount for realizing the 360° indicated requested torque as the target air amount;
   an arithmetic unit that determines an opening of the throttle based on the target air amount;
   an arithmetic unit that calculates actual pump loss from actual intake pipe pressure;
   an arithmetic unit that calculates second 360° indicated requested torque by adding the actual pump loss to the requested torque;
   an arithmetic unit that calculates estimated torque that is realized under optimal ignition timing based on an actual opening of the throttle; and
   an arithmetic unit that determines ignition timing with a ratio of the second 360° indicated requested torque to the estimated torque as a target efficiency, wherein
the control device controls ignition timing according to the determined ignition timing,
wherein the internal combustion engine has one or a plurality of actuators that change the air amount in cooperation with the throttle,
the control device further comprising:
an arithmetic unit that calculates a target actuator value or target actuator values of the one or the plurality of actuators based on the target air amount; and
an arithmetic unit that corrects the target intake pipe pressure in accordance with the target actuator value or the target actuator values, wherein
the control device controls the throttle according to the determined openings.

* * * * *